March 24, 1931.   R. H. ZINKIL ET AL   1,797,563
CATCH FOR PLUMBING FIXTURE WASTE STEMS
Filed May 25, 1928
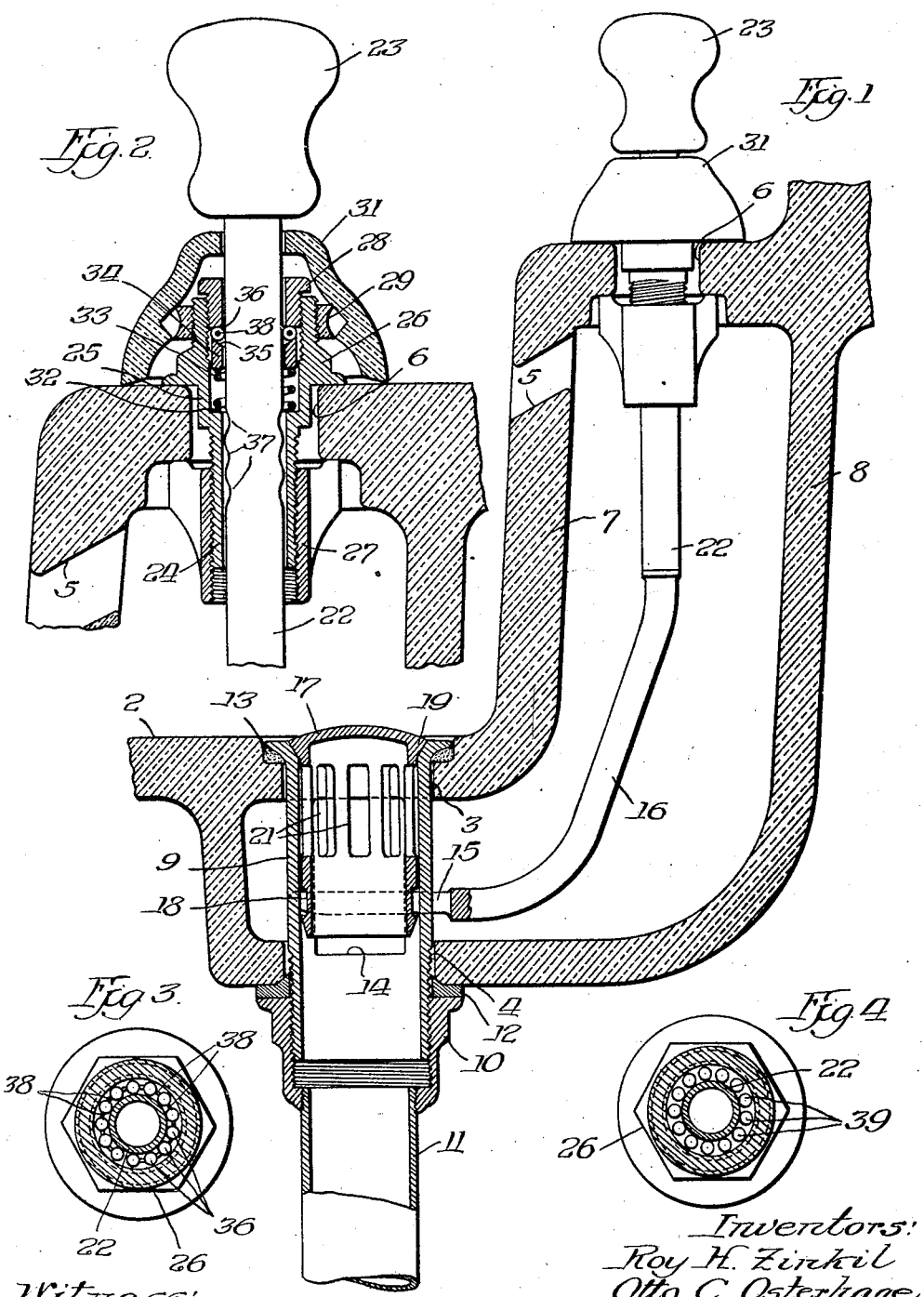
Inventors:
Roy H. Zinkil
Otto C. Osterhage Patented Mar. 24, 1931

1,797,563

UNITED STATES PATENT OFFICE

ROY H. ZINKIL AND OTTO C. OSTERHAGE, OF CHICAGO, ILLINOIS, ASSIGNORS TO CRANE CO., OF CHICAGO, ILLINOIS, A CORPORATION OF ILLINOIS

CATCH FOR PLUMBING-FIXTURE WASTE STEMS

Application filed May 25, 1928. Serial No. 280,422.

This invention pertains to a catch, holding or stop mechanism for a reciprocable stem and such as is frequently used in connection with the waste plug of a plumbing fixture such as a wash basin, tub or other device or devices of like character.

One of the very common waste plug operating mechanisms includes a rod or link mechanism projecting from some convenient or accessible place where it is provided with a handle behind or exterior of the plumbing fixture and connecting with the waste plug through a suitable connection whereby upon reciprocation of the handle and stem rod or link the plug will be raised or lowered to open or close the waste outlet orifice. These mechanisms are so common that they need not be further described herein except to say that in most cases the operating rod or stem or link is designed to be held in its adjusted, open or closed position by means of friction packing and the like disposed in a gland through which the rod, stem or link or some other part of the mechanism passes. However, friction packing often shrinks or wears through constant reciprocation of the stem or the like through it and if it be not recompressed about the stem, the stem soon becomes loose in its mounting and will permit the waste plug to close or open of its own accord or under the influence of gravity and the weight of the several parts of the mechanism. The result is that the user is often discomfited and is obliged to procure the services of a plumber.

With our invention all difficulties encountered with the use of friction packing are eliminated or obviated and there is no necessity for repacking or recompressing packing in the stuffing box or gland and the stem and plug when once adjusted to a desired position will remain in such position until the mechanism is again positively operated to change such position. In this connection it should be observed that while we are illustrating and describing the invention in connection with a mechanism by which upon raising and lowering the handle the waste plug is raised and lowered respectively, the invention is equally applicable to mechanisms so constructed that upon raising the handle the waste plug will be lowered to close the waste outlet and upon lowering the handle the waste plug will be raised to open the waste outlet. Other adaptations and uses of the invention will be or should become readily appreciated by those skilled in the art.

One of the primary objects of the invention is to provide a catch mechanism adapted to retain a reciprocable rod in one or more selected positions.

Another object of the invention therefore is to provide a catch mechanism particularly well suited for waste plug operating stems or mechanisms which will automatically secure the stem or other mechanism in its adjusted position practically regardless of the time of use and a catch which will not be dependent in any wise upon packing and frequent adjustments to keep it in working order.

Many other objects including the provision of a catch that will be simple and economical to manufacture, easy to install, replace or repair and dependable and reliable over long periods of use, as well as the functions and advantages of the invention, will be or should become readily appreciated after reading the following description and claims and after viewing the drawings, wherein:

Fig. 1 is a longitudinal sectional view through a portion of a plumbing fixture equipped with a waste outlet plug and a hand operable mechanism including a lift rod or stem embodying the invention, Fig. 2 is an enlarged detail sectional view through the upper portion of the fixture and a mechanism associated with the stem or rod adjacent the handle showing our invention applied thereto, Fig. 3 is a section taken on the line 3—3 of Fig. 2, and Fig. 4 is a view similar to that of Fig. 3 showing a modified arrangement.

In the illustrated embodiment of the invention, an enameled iron, porcelain or other vitreous substance basin generally designated 2 is formed with aligned apertures 3 and 4 in the bowl and an auxiliary portion respectively, for connection of the waste pipe, with an overflow orifice 5 and several other orifices for the spigots and their connections and the waste plug operating mechanism and its connections. The waste plug connection opening or orifice is designated 6. In the embodiment illustrated the rear portion of the basin or wash bowl has a double wall one portion of which is designated 7 and the other portion of which is designated 8, the space between being cored out to provide space for the waste outlet plug operating mechanism.

A spud 9 passes through the aligned outlet openings 3 and 4 and is secured in position by a ring nut 10 which threads thereon and also serves to connect the spud with a waste pipe 11. A rubber gasket 12 is preferably placed between the outer wall 8 of this portion of the bowl and the ring nut 10 to effect a leak proof joint since the cored space between the walls 7 and 8 is adapted to receive overflow water and any leakage from about the spud at its upper end. The spud is set in cement or putty 13 at its upper end in the usual manner and at diametrically opposite sides and for a considerable portion of its length as shown at 14 is cut away for two purposes, first, to permit water to drain from the cavity between the walls 7 and 8 and, second, to permit connection between the forked end 15 of an operating rod 16 and the waste plug 17; the two prongs (one shown) of the fork 15 being arranged to engage in a circumferential groove 18 formed in the lower end of the spud. The spud is provided with a ground seat 19 cooperating with a similar ground seat formed on the spud and has a series of apertures 21 through which the water passes when the plug is in its upper or open position.

The rod 16 which is distorted somewhat to provide proper clearances during raising and lowering of the waste plug is preferably made separate from another rod 22 which may be threadedly or otherwise connected to the rod 16 and the two rods 61 and 22 together form what may be termed the lift rod for the waste plug. When the handle 23 which is attached to the upper end of the rod 22 is raised or lowered the lift rod is reciprocated to raise or lower the waste plug as the case may be.

A rod guide 24 closely fitting the stem or rod 22 but with sufficient clearance to permit the rod 22 to slide easily up and down therethrough has an upper portion 25 spaced away from the rod 22 to provide a recess extending circumferentially about the stem and is adapted to be secured in and through the aperture 6 by an integral flange 26 and a wing nut 27 between which the marginal edges of the basin about the aperture 6 are clamped. The upper end of the portion of the rod guide is internally and externally threaded as will be noted, internally to receive a gland nut 28 and externally to receive an escutcheon ring 29 by which an escutcheon 31 is secured over and about the gland nut and guide.

The circumferential recess formed by the portion 25 of the rod guide terminates at its bottom in the shoulder 32 against which one end of a spring 33 abuts, the opposite end of the spring abutting against the underside of a gland 34 freely movable up and down within the recess. The top surface of the gland ring 34 is inwardly and downwardly beveled about its entire circumference to provide a beveled surface 35 between which and the bottom surface of the gland nut 28 one or more balls 36 are disposed. The spring 33 and the shoulder 35 normally tend to keep the ball or balls 36 at their upper and innermost positions or limits. The stem at places corresponding to positions to which it should be raised or lowered for a particular setting of the waste plug is circumferentially grooved as shown at 37; in the present instance only three grooves 37 are shown. The grooves 37 are preferably rounded transversely as will be noted in Fig. 2.

It will now be apparent that as the stem or lift rod is raised or lowered and the grooves 37 or one of them brought into register with the ball or balls 36 such ball or balls will be forced into the grooves under the influence of the spring 33 and beveled shoulders 35 and will hold the lift rod in its adjusted position. In the embodiment illustrated in Figs. 2 and 3 the balls 36 are rotatably mounted on connecting links 38 and together with the links form a ball chain very similar to the usual light switch chains well known in the art. Using such a ball chain is particularly efficacious inasmuch as the balls are kept in predetermined spaced relation to one another and cannot easily become lost. Of course, independent balls may be used as shown at 39 in Fig. 4, and as will be obvious, while it is preferable to have the grooves 37 extend circumferentially of the stem portion 22 and to use a number of spring pressed balls, nevertheless the grooves 37 may be mere depressions in one side of the stem and but one or two spring pressed balls 36 arranged for engagement in the depressions.

The advantages of our invention over the prior constructions as discussed above should now be clearly appreciated and understood and the fact recognized that while we have illustrated and described a particular adaptation of our invention what is at present a preferred embodiment of the invention is susceptible of embodiment in structures and mechanisms bearing little, if any, physical resemblance thereto. Therefore we do not desire to be limited except by the spirit of the invention and the scope of the appended claims.

We claim:

1. A catch mechanism comprising a longitudinally movable stem having a groove in the surface thereof, a stem guide surrounding said stem and having a portion providing a recess about said stem, a ring in said recess and loosely surrounding said stem, and a catch element loosely disposed on one end surface of said ring and engageable within said groove, said ring having said end surface tapering inwardly toward said stem, the taper being so directed that said catch element on said surface will normally move under the influence of gravity toward said stem.

2. In a device of the character described a longitudinally reciprocable cylindrical stem having a plurality of grooves therein and thereabout, a stem guide about said stem, means providing a recess about said stem above said guide, a ring loosely mounted in said recess, a plurality of balls in said recess, surrounding said stem, and adapted to roll on the upper surface of said ring, said upper surface of said ring being tapered inwardly and downwardly, a spring disposed between the bottom of said ring and an abutment relatively stationarily secured with respect to said stem, and means for limiting longitudinal movements of said ring from said abutment.

3. In a device of the character described a longitudinally reciprocable cylindrical stem having a plurality of grooves therein and thereabout, a stem guide about said stem, means providing a recess about said stem above said guide, a ring loosely mounted in said recess, a connected chain of balls in said recess, surrounding said stem, and adapted to roll on the upper surface of said ring, said upper surface of said ring being tapered inwardly and downwardly, a spring disposed between the bottom of said ring and an abutment relatively stationarily secured with respect to said stem, and means for limiting longitudinal movements of said ring from said abutment.

4. In a plumbing fixture a reciprocable waste stem having a groove therein, a relatively stationary stem guide secured to said fixture, said guide having a shoulder thereon, a gland about said stem, a movable member between said shoulder on said guide and said gland, said member being adapted to engage said groove in said stem, resilient means for urging said gland in a direction parallel to said stem and additional means to cause said member to engage said groove in the stem.

5. In a plumbing fixture a reciprocable waste stem having a groove therein, a relatively stationary stem guide secured to said fixture, said guide having a shoulder thereon, a gland about said stem having a tapered end portion, a movable member between said shoulder on said guide and said gland, said member being adapted to engage said groove in the stem and resilient means for urging said gland in a direction parallel to said stem to cause said member to engage said groove in the stem.

In witness of the foregoing we affix our signatures.

ROY H. ZINKIL.
OTTO C. OSTERHAGE.